July 24, 1934.  W. J. PEARMAIN  1,967,322
CLUTCH
Filed June 10, 1931  2 Sheets-Sheet 1

Inventor:
William J. Pearmain
By Keeton, Hibben, Davis & Macauley Attys.

Patented July 24, 1934

1,967,322

UNITED STATES PATENT OFFICE 1,967,322

CLUTCH

William J. Pearmain, Racine, Wis., assignor to The Twin Disc Clutch Company, Racine, Wis., a corporation of Wisconsin Application June 10, 1931, Serial No. 543,301

7 Claims. (Cl. 192—68)

My invention relates to clutches and particularly to a manner of construction in which provision is made for a cushioned and generally flexible driving engagement between the members of the clutch.

One object is to devise a clutch of the character indicated in which flexible material is interposed between the hub and the clamping members in order to provide for an elastic drive, an absorption of the shocks of starting and stopping, and an automatic compensation for any slight misalignment of parts arising by reason of wear or irregularities in fit.

A further object is to provide a clutch in which driving connection between the driving and driven parts is effected through the medium of a plurality of flexible bodies which may be made of rubber or of any material having an equivalent flexible property, the disposition and shape of the bodies being such as to provide for a toothlike engagement with the adjacent parts of the clutch.

A further object is to incorporate, in a clutch employing shiftable clamping members, flexible bodies having the characteristics noted above and to mount the clamping members for movement on such bodies, special means being utilized to retain the bodies in position against the strains of operation.

A further object is to devise a clutch employing a split driving plate which is particularly arranged for easy removal from the clutch proper to permit replacement of the friction material without requiring any disassembly of the remaining clutch parts.

A further object is the utilization of a rotatable hand wheel which is threaded on a fixed part, and is therefore capacitated for movement axially of the clutch, as a means for actuating the customary clutch levers to release the clutch.

These and further objects of my invention will be set forth in the following specification, reference being had to the accompanying drawings, and the novel means by which said objects are effectuated will be definitely pointed out in the claims.

Figure 1:
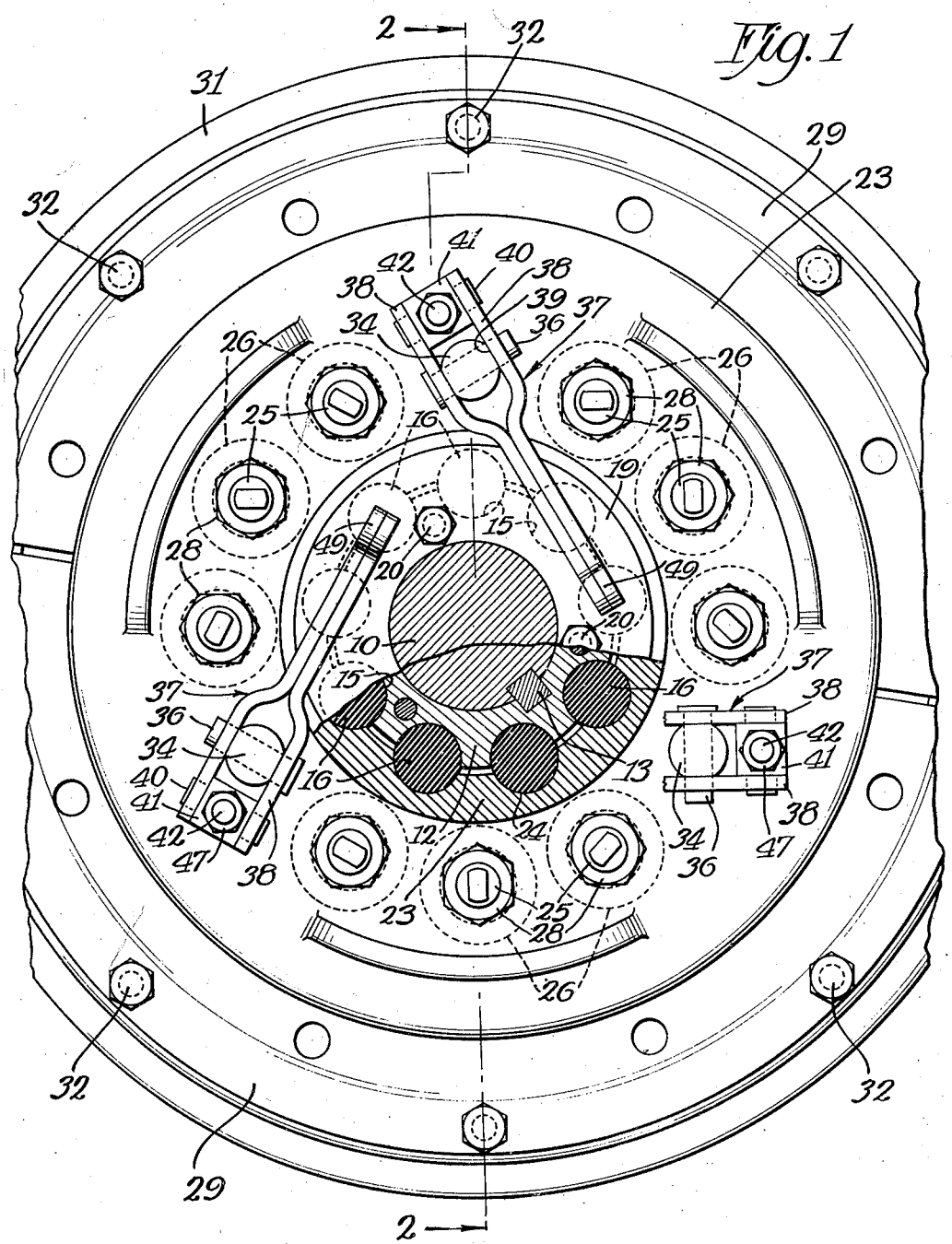
Figure 1 is an end view of the clutch, partly in section, as taken along the line 1—1 in Fig. 2, looking in the direction of the arrows.

Referring to the drawings, the numeral 10 designates a shaft which constitutes, for descriptive purposes, the driven member of the clutch and which may be slightly tapered as at 11, adjacent one end thereof, to receive a hub 12 that is secured to said shaft by means of a key 13. The left end of the shaft, as viewed in Fig. 2, may be threaded as at 14 for a purpose presently explained.

A plurality of parti-circular grooves 15 is equally spaced around the periphery of the hub, preferably extending from end to end of the latter, and within each groove is mounted a flexible, cylindrical body 16 which may be formed of rubber or of some other convenient material that will serve to carry the intended load of the clutch, as well as providing for a flexible mode of operation in a manner comparable to that exhibited by rubber. The bodies 16 project beyond the periphery of the hub 12 for approximately one-half of their diameter and in order to retain said bodies in positions endwise of the hub, a retaining plate 17 is mounted on the left end of the hub and is held in position by a nut 18 which is threaded on the shaft end 14. At the opposite end of the hub 12, a similar retaining plate 19 performs a like service and is held in the indicated position by a plurality of cap screws 20 which are threaded in said hub. As shown clearly in Fig. 2, clearance is provided between the ends of the bodies 16 and the retaining plates for a purpose hereinafter explained.

A clamping member 21 having a plurality of grooves 22 extending inwardly from the bore thereof which are complementary disposed and shaped with reference to the similar grooves 15 in the hub, is mounted on the bodies 16 adjacent the retaining plate 17. Similarly, a second clamping member 23 having a plurality of internal grooves 24, is also mounted on said bodies adjacent the retaining plate 19, the disposition of the several parts being such that the clamping members 21 and 23 are entirely spaced from the hub 12 by (see Fig. 1), and have driving engagement with the latter only through the flexible bodies 16. The disposition of the cylindrical bodies 16 provides a tooth-like conformation which is very effective for the purpose of securing an adequate driving engagement between the clamping members and hub, while the cylindrical shape of the bodies provides for the necessary external, contacting surface, as well as for the mass required for strength purposes. It will be understood, however, that other shapes may be adopted for the bodies 16 without departing in any respect from the generic nature of the invention in this regard.

The clamping members 21 and 23 are connected for driving purposes by means of a plurality of bolt-headed driving pins 25, each of which passes freely through said members (see Fig. 2) and has mounted thereon a coil spring 26, the left end of which abuts against a washer 27 which contacts with the head of the pin and the opposite end against the adjacent face of the clamping member 21. Beyond the clamping member 23, the driving pin 25 is threaded to receive a nut 28 which serves to establish the required tension in the spring 26 for the purpose of loading the clutch, the nature of the construction being such that the spring 26 always tends to move the clamping members into driving position.

A split driving plate 29 having appropriate facings 30 of friction material is interposed between the clamping members and adjacent its periphery is attached to a flywheel 31 or other form of driving member, constituting the other rotary part of the clutch, by means of cap screws 32. A spacer ring 33 may be employed in order to set the members of the split plate away from the flywheel for a convenient distance in order to facilitate the removal of the plate members at such times as it may be required to renew the friction material. The split plate renders it possible to effect this renewal without disassembly of the remaining parts of the clutch.

In order to separate the members 21 and 23 from clamping engagement with the driving plate and so interrupt the flow of power from the flywheel 31 to the shaft 10, the following instrumentalities are provided:

A pin 34 passes freely through the clamping member 23 and is provided with a reduced portion 35 which is riveted or otherwise secured in the clamping member 21, so that said member and the pin 34 may move as a unit. Adjacent the right extremity of the pin 34, as viewed in Fig. 2, the latter is provided with a pin 36 in order to form a pivotal connection with a clutch lever 37 which is composed of a pair of lever plates 38 that are spaced on opposite sides of the pin 34, the latter being preferably slightly flattened as at 39 in order to provide for an adequate contact. In the levers shown in Fig. 2, the lever plates 38 extend upwardly above the pin 34 for pivotal engagement with a pin 40 which passes through said plates and a block 41 slidably mounted upon an eye bolt 42. Said bolt extends toward the clamping member 23 and the eye portion thereof is pivotally mounted on a pin 43 which is in turn secured in a pair of ears 44 formed on the member 23. A coil spring 45 encircles the eye bolt 42, one end thereof abutting against a washer 46 which contacts with the ears 44 and the other end against the block 41. A nut 47 threaded on the right extremity of the eye bolt provides for the necessary tension in the spring 45. Below the pin 36, the lever plates 38 are bent toward each other to contact for the remainder of their length down to and including the lower extremity of the lever 37 whereon is formed a nose 49 which extends toward the right, as viewed in Fig. 2. It will be understood that as many of the foregoing lever release mechanisms may be employed as circumstances may require, three such being illustrated in Fig. 1, with the nose portions thereof disposed relatively close to the shaft 10 in order to reduce the size of the parts for actuating said levers, which parts will now be described.

A sleeve 50 encircles the shaft 10 and is suitably held against rotary and longitudinal movements relative thereto by any convenient means. Said sleeve is provided with a threaded hub 51, upon which is mounted a hand wheel 52 that is internally bored as at 53 on the side facing the clutch levers, to receive a thrust bearing 54. The left race of the thrust bearing is intended to bear against the lever noses 49, so that the former will have a diameter which is adequate for this purpose.

Figure 2:
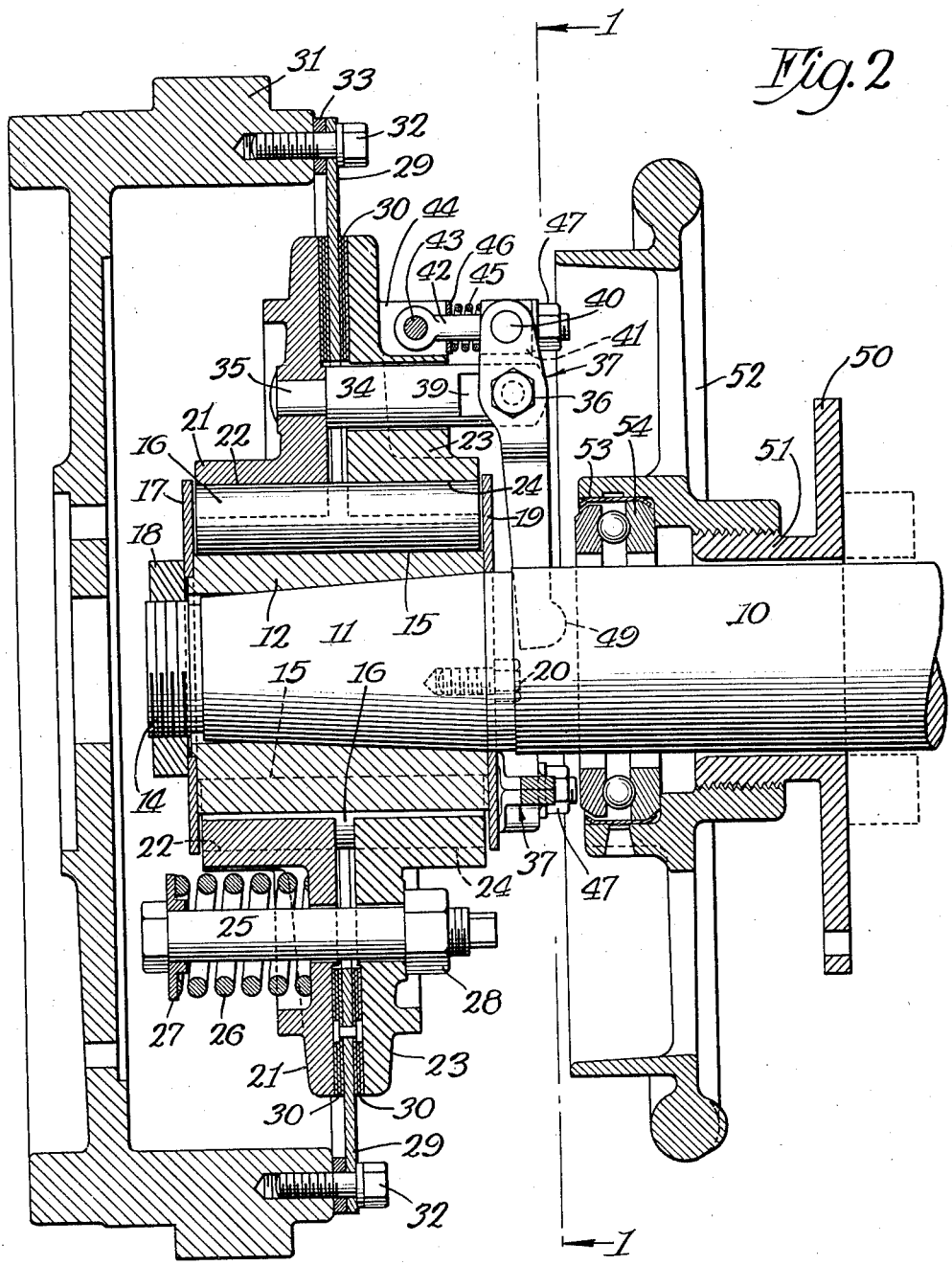
Fig. 2 is a vertical, sectional elevation as taken generally along the line 2—2 in Fig. 1, looking in the direction of the arrows.

In describing the operation of the clutch, it will be assumed that the several parts occupy the positions shown in Fig. 2. At this time, the hand wheel 52 occupies a fully retracted position and the clamping members 21 and 23 are in driving engagement with the driving plate 29 under the impulse of the loading springs 26. If now, it is desired to interrupt the flow of power through the clutch, it is only necessary to rotate the hand wheel 52 in such a direction as to cause it to move axially toward the left, as viewed in Fig. 2, until the left race of the thrust bearing contacts with the lever noses 49.

Continued rotation of the hand wheel will accordingly rock the noses 49 toward the clutch proper, thereby moving the clamping member 21 toward the left and the clamping member 23 toward the right, by reason of the instantaneous fulcrums provided by the pins 36 and 40 at appropriate times and the stops afforded by the retaining plates 17 and 19. When the hand wheel 52 is rotated in the opposite direction, the springs 26 will return the parts to the position shown in Fig. 2. It will be understood that the usual lever or other mechanism may be employed as a substitute for the hand wheel.

The flexible bodies 16 insure a substantially cushioned drive through the clutch and automatically take up any slight misalignment of parts arising from any cause. The bodies also serve to absorb to a considerable extent the shocks of starting and stopping and so provide for a a smoother operation of the clutch. The space between the ends of the flexible bodies and the adjacent retaining plates allows for the temporary extension in length of these bodies as they are subjected to the load. In the case of rubber, for example, the bodies would be literally squeezed between the clamping members and the hub, thus causing a flowing of the material endwise of the hub. The indicated spaces provide for this condition and thus avoid any undue strain on the indicated parts.

While I have shown one set of elements and combinations thereof for effectuating my improved clutch, it will be understood that the same is intended for purpose of illustration only and in no wise to restrict my device to the exact forms and structures shown, for many changes may be made therein without deparing from the spirit of my invention.

I claim:

1. In a clutch, the combination of a friction plate attachable to a rotary part, a shaft constituting a second rotary part, a pair of shiftable clamping members for engaging said friction plate disposed on opposite sides thereof, and flexible means for directly connecting and solely supporting each of said members to and on the shaft and adapted to permit shifting of said members.

2. In a clutch, the combination of a friction plate attachable to a rotary part, a hub constituting a second rotary part, a plurality of flexible bodies disposed around the periphery of said hub, and a pair of shiftable clamping members for engaging said friction plate disposed on opposite sides thereof and each having a direct driving and solely supportable connection with said bodies.

3. In a clutch, the combination of a friction plate attachable to a rotary part, a shaft constituting a second rotary part, a pair of shiftable clamping members for engaging said friction plate disposed on opposite sides thereof, and flexible means common to both of said members for directly connecting and solely supporting said members to and on the shaft and adapted to permit shifting of said members.

4. In a clutch, the combination of a friction plate attachable to a rotary part, a hub constituting a second rotary part, a plurality of flexible bodies disposed around the periphery of said hub, and a pair of shiftable clamping members for engaging said friction plate disposed on opposite sides thereof and each having a direct driving and solely supportable connection with said bodies, each of said bodies being common to said members.

5. In a clutch, the combination of a friction plate attachable to a rotary part, a hub constituting a second rotary part and having a plurality of peripherally disposed recesses, a plurality of elastic bodies located in said recesses, a shiftable clamping member for engaging said plate mounted on said bodies and having a driving connection therewith, and a stop plate on said hub for limiting the releasing movement of said member and the expansion of said bodies under load.

6. In a clutch, the combination of a friction plate attachable to a rotary part, a hub constituting a second rotary part and having a plurality of peripherally disposed recesses, a plurality of cylindrical, rubber bodies located in said recesses, a shiftable clamping member for engaging said plate mounted on said bodies and having a driving connection therewith, and a stop plate on said hub for limiting the releasing movement of said member and the expansion of said bodies under load.

7. In a clutch, the combination of a friction plate attachable to a rotary part, a hub constituting a second rotary part and having a plurality of peripherally disposed recesses, a plurality of elastic bodies located in said recesses, a pair of shiftable clamping members for engaging said plate on opposite sides thereof mounted on said bodies and having a driving connection therewith, and a pair of stop plates adjacent the opposite ends of said bodies for limiting the releasing movement of said members and the expansion of said bodies under load.

WILLIAM J. PEARMAIN.